Patented Feb. 16, 1926.

1,573,596

UNITED STATES PATENT OFFICE.

EDWARD J. WALL, OF WOLLASTON, AND DANIEL F. COMSTOCK, OF BOSTON, MASSACHU-SETTS, ASSIGNORS TO KALMUS, COMSTOCK & WESCOTT, OF BOSTON, MASSACHU-SETTS, A CORPORATION OF MASSACHUSETTS.

METHOD OF TREATING PHOTOGRAPHIC EMULSION AND COLOR-SENSITIZING COMPOSITION.

No Drawing. Application filed July 11, 1917, Serial No. 179,791. Renewed September 12, 1923.

*To all whom it may concern:*

Be it known that we, EDWARD J. WALL, a citizen of the United States, and resident of Wollaston, in the State of Massachusetts, and DANIEL F. COMSTOCK, a citizen of the United States, and resident of Boston, in the State of Massachusetts, respectively, have invented new and useful Improvements in Methods of Treating Photographic Emulsion and Color-Sensitizing Composition, of which the following is a specification.

This invention relates to treating photographic emulsions and more particularly to color-sensitizing dye compositions for rendering photographic emulsions more sensitive to light of certain colors.

There have been two methods in common practice for sensitizing collodion and gelatin emulsions, viz, one in which the dye is added to the emulsion just before coating the same on the film or other support, and one in which the finished dry plate or film is bathed in an aqueous solution of the dye. The first method has been generally adopted in the commercial manufacture of color-sensitive plates and films, not on the basis of efficiency and effectiveness but because of its convenience. The second method affords results which are far superior with respect to color rendering, but it has not been extensively adopted commercially, chiefly for the reason that it has been extremely wasteful and therefore costly.

Many organic dyes are employed in the photographic art for rendering silver and other emulsions sensitive to light of various colors or hues. Among the more prominent of these dyes may be mentioned, by way of example, the isocyanine group, and such individual dyes as ethyl red (quinaldinquinaldiniodid), homocol (mixture of an isocyanine dye with quinolin red, Schultz #610, which is the product of reaction of one mol. benzotrichlorid on a mixture of one mol. quinaldin and one mol. isoquinolin in the presence of zinc chloride), orthochrome T (p-toluquinaldin-p-toluquinolinethylcyanin bromid), pinachrome (p-ethoxyquinaldin-p-methoxyquinolinethyl-cyanin bromid), pinachrome violet (1:1'-diethyl-6:6'-aminocarbocyanin halide or the corresponding dimethyl compound), pinacyanol (product of reaction of formaldehyde, followed by alkali, on quinaldinium iodethylate), pinaverdol (p-toluquinaldinquinolinium methyl-cyanin bromid), dicyanine (product of reaction of potash and atmospheric oxygen on alpha-gamma-dimethylquinolinium salts), etc. The usual method of applying these dyes, after the photographic plates or films have been manufactured, comprises bathing the plates or films in an aqueous bath into which has been freshly poured an alcoholic solution of the sensitizing dye or dyes. Small quantities of the dyes diffuse into the film of gelatine or other substance and impart color sensitiveness to the grains of silver emulsion, probably by virtue of the photo-electrical properties of the dyes.

Heretofore it has been possible to utilize only a small fraction of the dye in such a solution owing to the fact that, after a brief interval of association with the photographic substance and before more than a few per cent of the dye content is exhausted, the dye coagulates and precipitates out of the bath. Owing to the excessive cost of these dyes and the great difficulty of obtaining them some satisfactory method of prolonging the useful life of the aqueous bath has been greatly desired but up to the present time appears to have remained undiscovered.

This premature precipitation of the dye is particularly objectionable where, as is usually the condition, the solution contains a plurality of sensitizing elements mixed in definite proportions to produce a certain color sensitiveness in the photographic emulsion, for under such circumstances the several dyes are precipitated at different rates and the correct proportions of the suspended components of the dyes therefore cannot be maintained. Moreover the precipitated residue, even if recovered in dry form, cannot be used over again by being redissolved in alcohol without first being carefully analyzed to determine the proportions of the several dyes. Another reason why bathing solutions have heretofore given great difficulty is that a progressive change appears to go on in the dye solution even before noticeable precipitation begins and it is not possible therefore to repeat the sensitizing process with similar results after the lapse of even so short a time as ten minutes. It is therefore practically hopeless to standardize the sensitizing process with the solutions now known.

In our prior application Sr. No. 179,050, filed July 6, 1917, a method of overcoming the above mentioned difficulties, thereby greatly increasing the useful life of dye solutions of the stated character, has been disclosed. The said method comprises adding to the dye composition an ingredient such as gelatine, albumen, water-glass, dextrin, sugar, starch, casein, glycerine, or other emulsoid or the like, which is adapted to restrain the solidification of the dye ingredient. As fully described in the former application the color-sensitizing dye ingredient when mixed with water appears to form a colloidal solution of the type known as suspensoidal, the microscopic particles of which have been found to possess a strong tendency to coalesce and precipitate under certain conditions, as for example when the solution is brought into contact with a photographic emulsion. The ingredient for restraining the precipitation of the dye is thought to act as an emulsoidal colloid to protect the suspensoidal colloidal particles from coalescence. The addition of one of the above-named ingredients, or an ingredient of similar characteristics, has been found effectually to restrain the said precipitation or coalescence.

However, we have found that when employing gelatine or other anti-precipitating ingredient in the dye solution the photographic emulsion to which the solution is applied frequently becomes fogged. This we believe to be due at least in part to a reducing action of the protective colloid upon the photographic emulsion. For example, the preferred protective colloid, gelatine, is ordinarily bleached with sulphurous acid during manufacture and owing to the fact that all of the sulphurous acid is not extracted therefrom commercial gelatine ordinarily contains either sulphurous acid or sulphites formed thereby. Sulphurous acid and sulphites constitute reducing agents and reducing agents affect a photographic emulsion similarly to light. Therefore, the reducing action of the commercial gelatine we believe to be one cause of fogging.

Moreover, when employing metallic containers for the dye solution either before the dye solution is applied to the photographic emulsion or, as in the dyeing machine disclosed in the application of William B. Wescott, Sr. No. 556,535, filed April 25, 1922, while the dye solution is being applied to the emulsion, we have found that fogging sometimes results due to causes other than the reducing impurities in the protective colloid. These causes we believe to involve a reaction between the dye solution and the metallic container which results in the formation of reducing agents which act upon the photographic emulsion to produce fog in a manner similar to that of the reducing impurities sometimes present in the protective colloid. For example, when employing a tin container the dye solution interacts with the tin to produce the lower salts of tin, i. e., the stannous compounds of tin. These stannous compounds are reducing agents and affect the photographic emulsion in the same manner as does light. The chemical action on the tin or other metal is probably due at least in part to a slight decomposition of the iodine or bromine compounds in the photographic emulsion into water and either iodine or bromine, the iodine and bromine setting up an electrolytic action on the metallic container to form a stannous or other "ous" compound of iodine or bromine which fogs the emulsion by reduction. In the present invention the "ous" compounds are preferably either prevented from forming by permitting only "ic" compounds to form or converted into "ic" compounds which do not affect the emulsions.

In order to prevent the dye composition from fogging the photographic emulsion when brought into association therewith we propose to convert the reducing agents in the composition, whether due to impurities in the protective colloid or to interaction of the dye composition with metal or other causes, into such form that they will not affect the emulsion. Our preferred method of accomplishing this result according to the present invention comprises adding to the dye solution an oxidizing ingredient which will react with the reducing agents to produce compounds which are non-reducing. Suitable ingredients for the purpose comprise hydrogen peroxide or other peroxides, although other oxidizing ingredients, as e. g. nascent oxygen, bromine, or iodine, hypochlorites or hypobromites, will serve the purpose fairly satisfactorily.

We have also discovered that superior results, particularly in the way of uniformity of dye action, can be obtained, especially when employing an oxidizing ingredient, by adding to the composition a small amount of an alkali or acid-neutralizing ingredient. Acidity of the dye composition may result in a bleaching of the dye, an acid, even carbonic acid, acting quickly in some cases to bleach the dye suspended in the solution The objectionable acidity may be due to impurities in the water employed to form the dye solution, in the container, or in the air, and when employing an oxidizing agent it is particularly due to the acid which is ordinarily present in small measure in the oxidizing agent, as e. g. in the hydrogen peroxide when using this compound as the oxidizing ingredient.

Moreover, the use of an alkali is of particular significance when using an oxidizing ingredient for the reason that oxidizing agents will themselves bleach photographic dyes of the isocyanine type when acid but not when alkaline. For example, the nascent oxygen formed upon the addition of hydrogen peroxide to an acid dye solution will result in the formation of leuco compounds and colorless dye bases, but by rendering the solution alkaline the nascent oxygen is prevented from bleaching the dye.

The preferred method of rendering the composition alkaline is to add a volatile alkali such as ammonia to the solution in sufficient amount to neutralize the acidity resulting from impurities in the water, container, air, oxidizing ingredient, or from other cause.

In order more clearly to disclose our present invention we set forth the following concrete example of one application of the principles involved: To 2000 parts water add the protective colloid in an amount of the order of 1 part, as disclosed in our former application above referred to; then add the hydrogen peroxide or other oxidizing agent in an amount of the order of ½ part, i. e., one-half the amount of the protective colloid; next add the ammonia or other neutralizer in an amount of the order of 1½ parts; and finally add the isocyanine or other dye in an amount of the order of 2 parts.

While we believe the above proportion of ingredients and order of mixing most satisfactorily meets average conditions it is to be understood that variations may be made within the scope of the appended claims. For example, considerably greater amounts of protective colloid may be used but more than the proportion given is ordinarily unnecessary to produce the desired restraint of precipitation. On the other hand as small an amount of protective colloid as one-fifth the stated amount will prevent precipitation of the dye for some time, though not as long as when using the stated amount. The amount of oxidizer depends largely on the character of the protective colloid and the container and may vary through a considerable range. The amount of neutralizer depends upon the degree of acidity of the water, etc., and upon the character of the oxidizer. When using a peroxide as the oxidizer the alkali may under certain circumstances be dispensed with, as e. g. when employing sodium peroxide which breaks up in the presence of water forming sodium hydroxide and oxygen. However, we prefer to use hydrogen peroxide as the oxidizing substance inasmuch as it breaks up into water and oxygen.

It is desirable to add the neutralizer before the dye is added so as to avoid bleaching of the dye when added. As above stated the oxidizer is of particular significance when using a protective colloid such as gelatine and the alkali is of particular utility when employing an oxidizer.

As above explained, the present invention is of particular utility with relation to metallic dye containers. Heretofore, it has not been possible to employ metallic containers for color-sensitizing as the electrolytic currents set up by all prior dye solutions have caused some of the metals to pass into solution and the dyes to flock out from their suspensions. Moreover, mere contact of former dye solutions with a metallic surface causes the dye to precipitate, unless the surface is wholly free from an adherent film of oxide or other product of weathering, inasmuch as the oxides or other salt of the metals act as mordants and form insoluble color lakes with the dye color bases.

We claim:

1. A composition for treating photographic emulsions comprising a color sensitizing dye ingredient and an oxidizing agent.

2. A composition for treating photographic emulsions comprising a color sensitizing dye ingredient and an oxidizing agent for preventing the reduction of the emulsion.

3. A dye composition adapted to color-sensitize photographic emulsions comprising a colloidal color sensitizing dye solution, a protective agent for restraining precipitation of the dye, and an oxidizing agent for preventing reduction of the emulsion by the protective agent or other reducing agent.

4. A composition for treating photographic emulsions comprising a color sensitizing dye ingredient and a peroxide.

5. A composition for treating photographic emulsions comprising a colloidal color sensitizing dye solution, an emulsoidal ingredient, and an oxidizing agent.

6. A composition for treating photographic emulsions comprising a suspensoidal color sensitizing dye, an emulsoid, and a peroxide.

7. A composition for treating photographic emulsions comprising a color sensitizing dye ingredient and an acid-neutralizing ingredient, the latter being of such proportionate amount as to prevent bleaching of the dye ingredient.

8. A composition for treating photographic emulsions comprising a color sensitizing dye ingredient, an oxidizer, and an acid-neutralizer.

9. A composition for treating photographic emulsions comprising a suspensoidal color sensitizing dye, an emulsoid, an oxidizer, and an acid-neutralizer.

10. A composition for treating photographic emulsion comprising a suspensoidal color sensitizing dye, an emulsoid in sufficient amount to restrain the precipitation of the dye upon association with the photographic emulsion, and an oxidizing agent for preventing reduction of the emulsion by the emulsoid or other reducing agent.

11. A composition for treating photographic emulsion comprising a suspensoidal color sensitizing dye, an emulsoid in sufficient amount to restrain the precipitation of the dye upon association with the photographic emulsion, and an acid-neutralizing ingredient in such amount as to prevent bleaching of the dye ingredient.

12. A photographic composition comprising a colloidal color sensitizing dye solution, a colloidal substance for restraining the coagulation of the colloidal dye, and an oxidizing agent.

13. A photographic composition comprising a colloidal color sensitizing dye solution, a colloidal substance for restraining the coagulation of the colloidal dye, and an acid-neutralizing ingredient.

14. A photographic composition comprising a colloidal color sensitizing dye solution, a colloidal substance for restraining the coagulation of the colloidal dye, and a peroxid.

15. A photographic composition comprising a colloidal color sensitizing dye solution, a colloidal substance for restraining the coagulation of the colloidal dye, and an alkali.

16. A color-sensitizing dye composition for photographic emulsion comprising a color sensitizing dye ingredient and hydrogen peroxide.

17. The method of color-sensitizing photographic emulsion comprising applying to the emulsion a color sensitizing composition which is non-reducing.

18. The method of color-sensitizing photographic emulsion comprising applying to the emulsion both a color sensitizing dye ingredient and an oxidizing ingredient whereby any tendency toward reduction of the emulsion is counteracted by the oxidizing ingredient.

19. The method of color-sensitizing photographic emulsion comprising simultaneously applying to the emulsion both a color-sensitizing dye ingredient and an oxidizing ingredient whereby any tendency toward reduction of the emulsion is counteracted by the oxidizing ingredient.

20. The method of color-sensitizing photographic emulsion comprising applying to the emulsion a color-sensitizing dye composition which is non-acidic.

21. A composition for treating photographic emulsion comprising an ingredient adapted to affect the actinic quality of the emulsion and an ingredient adapted to restrain fogging of the emulsion.

Signed by us at Boston, Massachusetts, this 6th day of June, 1917.

EDWARD J. WALL.
DANIEL F. COMSTOCK.